F. C. BRANDENBURG.
EMERY WHEEL DRESSER.
APPLICATION FILED APR. 29, 1911.
1,042,761.
Patented Oct. 29, 1912.
Fig. 1.
Fig. 2.
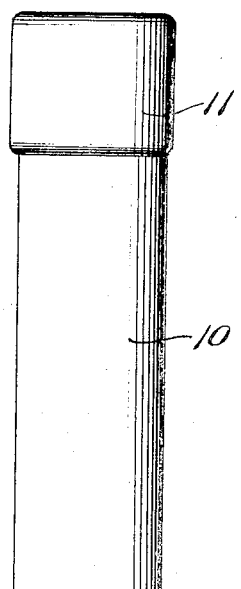
Fig. 3.
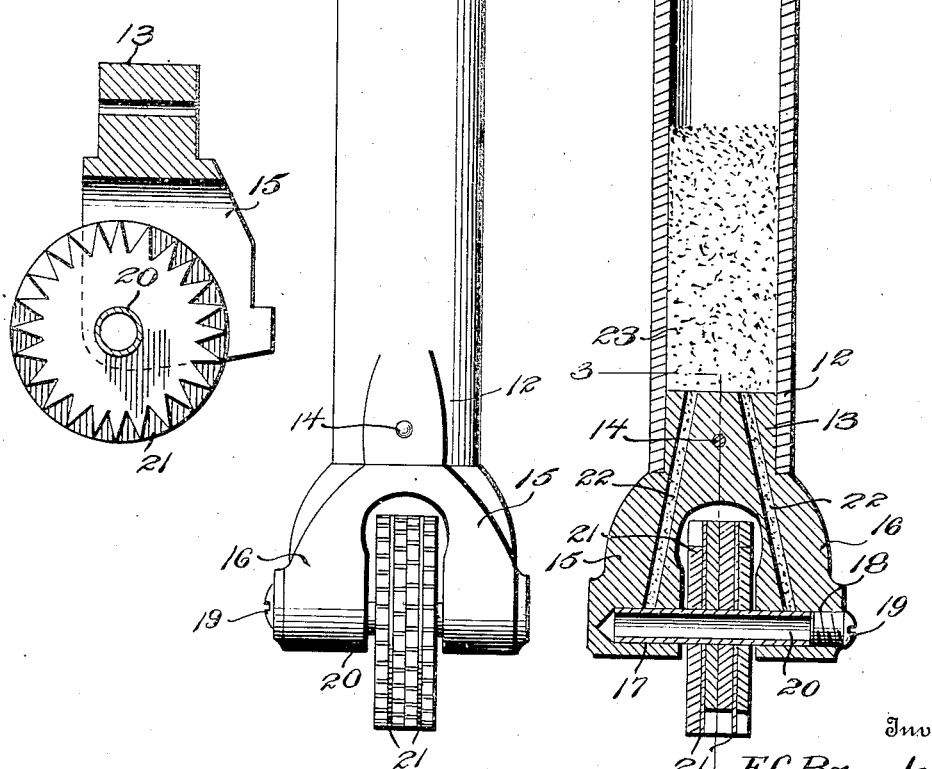
Witnesses
Inventor
F. C. Brandenburg
By
Attorneys.

UNITED STATES PATENT OFFICE.

FRANCIS C. BRANDENBURG, OF PIQUA, OHIO.

EMERY-WHEEL DRESSER.

1,042,761. Specification of Letters Patent. Patented Oct. 29, 1912.

Application filed April 29, 1911. Serial No. 624,228.

*To all whom it may concern:*

Be it known that I, FRANCIS C. BRANDENBURG, a citizen of the United States, residing at Piqua, in the county of Miami and State of Ohio, have invented certain new and useful Improvements in Emery-Wheel Dressers, of which the following is a specification.

This invention relates to emery wheel dressers, and particularly to a novel mounting and means for lubricating the cutters of the dresser.

The invention has for an object to so peculiarly shape and arrange the mounting elements for the cutters that a pulverized lubricant, such as finely ground or flaked graphite may be used in a dry state without a coagulating liquid, for instance water or oil, to lubricate the spindle and other moving parts instead of the oil and other fluid lubricants now employed, the latter collecting dust and grit from the stone being dressed, and thereby increasing the friction between the moving parts and the consequent wear on the same.

Another object of this invention is to provide a device of this nature with a magazine handle adapted to contain flaked lubricant, and to position a peculiarly shaped bearing upon the handle having communication therewith to receive the lubricant and to feed the same by gravity and by the vibration of the device to the movable spindle and cutters. By this improved arrangement the lubricant does not collect dust nor grit from the emery wheel, the movable parts are protected from undue wear, and the cutters and the spindle, which is preferably hollow, may be started quickly by the light contact of the cutters with the emery wheel.

A further object of this invention is to provide an emery wheel dresser with improved lubricating means which directs the lubricant to each end of the spindle, with means whereby the lubricant is fed by gravity and vibration to the moving parts, and wherein the complete lubrication of the device is insured.

For a full understanding of the invention and the merits thereof and also to acquire a knowledge of the details of construction, reference is to be had to the following description and accompanying drawings, in which:

Figure 1 is a side elevation of the improved emery wheel dresser; Fig. 2 is a similar view disclosing the same in section; and, Fig. 3 is a central section on the line 3—3 of Fig. 2.

Corresponding and like parts are referred to in the following description and indicated in all the views of the drawing by the same reference characters.

Referring to the drawing, 10 designates the tubular handle of the device closed at its upper end by a cap 11 disposed in threaded engagement over the handle 10. The lower end of the handle 10 is given angular shape, as at 12, the handle being in the present instance hexagonal and receiving snugly therein a correspondingly angularly formed shank 13 of a depending forked bearing. The shank 13 and the lower end of the handle 12 are given angular form to hold the shank 13 from rotation within the handle. A transverse rivet or pin 14 passes through the handle and shank 13 to hold the latter in position.

The forked bearing is provided with the depending spaced arms 15 and 16, the former being provided in its inner side with a spindle receiving opening 17 closed at the outer side of the arm 15. The arm 16 is provided with a threaded opening 18 extending entirely therethrough and registering with the opening 17. A preferably hollow spindle 20 is journaled at its ends in the openings 17 and 18, the spindle being positioned by insertion through the opening 18, and being held in such position by a screw plug 19 engaging in the outer end of the opening 18. A plurality of cutters 21 are positioned upon the spindle between the arms 15 and 16.

The improved lubricating means comprises a pair of downwardly extending ducts or channels 22 within the shank 13, the ducts 22 opening through the upper end of the shank 13 and extending down through the forked arms 15 and 16. The ducts 22 open at their lower ends into the spindle receiving openings 17 and 18. A quantity of flaked graphite 23 is placed in the tubular or magazine handle 10 and the ducts 22 are of such size as to admit of the free passage of the particles of graphite down through the shank and arms 15 to the ends of the spindle 20. As the handle 10 is held up at an inclination the graphite feeds down through the ducts 22 by gravity and the vibration of the device incident to its use in applying it to emery wheels stirs the particles of graphite and prevents the same clogging in the ducts 22. The particles of graphite pass from the lower ends of the ducts 22 to the outer face of the hollow spindle 20 at its opposite ends and is fed toward the central portion of the spindle. It is readily seen that this granulated, or solid lubricant is fed gradually to the bearings, and that it does not collect the dust and grit which fluid lubricants now commonly used do to a large extent.

In providing a hollow spindle for the cutters, the spindle is relatively light and can be started quickly upon the application of the cutters to the rotating element.

Having thus described the invention, what is claimed is:

1. In a device of the class described, a head having branching arms at one side and reduced at the other side, said arms having shaft bearings in their outer portions and diverging oil ducts piercing the arms and leading at their ends respectively into the shaft bearings and through the reduced portion of the head, a shaft adapted to carry a cutting member and engaging in said bearings, and a tubular handle engaging over the reduced portion of the head and forming a chamber for a lubricant and communicating with the ducts.

2. In a device of the class described, a head having branching arms at one side and reduced at the other side, said arms having shaft bearings in their outer portions and diverging oil ducts piercing the arms and leading at their ends respectively into the shaft bearings and through the reduced portion of the head, and said reduced head portion having a transverse aperture between the ducts, a tubular handle engaging over the reduced portion of the head and forming a chamber for a lubricant and communicating with the ducts, said handle having transversely alined apertures registering with the aperture of the head, and a pin extending through said alining apertures.

In testimony whereof, I affix my signature in presence of two witnesses.

FRANCIS C. BRANDENBURG. [L. S.]

Witnesses:
THOMAS J. RAFFERTY,
TOMAS WILBER HIGHLEY.